United States Patent [19]
Miralles et al.

[11] Patent Number: 5,674,310
[45] Date of Patent: Oct. 7, 1997

[54] METHOD AND APPARATUS FOR FEEDING REACTION GAS AND SOLIDS

[75] Inventors: Francisco Miralles; Enrique Delgado; Patricio Barrios, all of Huelva, Spain; Heikki Olavi Savolainen; Teuvo Pekka Tapio Hanniala, both of Espoo, Finland; Ilkka Veikko Kojo, Kirkkonummi, Finland

[73] Assignee: Outokumpu Engineering Contractors Oy, Espoo, Finland

[21] Appl. No.: 637,122

[22] Filed: Apr. 24, 1996

[51] Int. Cl.⁶ .................................. C22B 5/00; C21B 7/16
[52] U.S. Cl. ................................... 75/707; 266/182
[58] Field of Search ........................ 266/182; 75/707, 75/455, 639, 694; 110/264

[56] References Cited

U.S. PATENT DOCUMENTS 4,331,087  5/1982  Knuttu et al. ..................... 110/264
5,133,801  7/1992  Saarinen ............................. 75/707
5,362,032  11/1994  Ranki ................................. 266/182

*Primary Examiner*—Scott Kastler
*Attorney, Agent, or Firm*—Brooks Haidt Haffner & Delahunty

[57] ABSTRACT

The invention relates to a method and apparatus for feeding reaction gas and solids into a suspension smelting furnace, which apparatus comprises at least conduits for receiving reaction gas and solids and for further conducting them into a suspension smelting furnace, and in which apparatus at least the major part of the reaction gas is fed into the suspension smelting furnace through a reaction gas channel surrounding the solids feeding channel. According to the invention, in the reaction gas channel, essentially near to its end on the side of the suspension smelting furnace, there are installed adjusting members whereby the flow rate of the reaction gas fed into the suspension smelting furnace can be adjusted essentially steplessly.

10 Claims, 3 Drawing Sheets

METHOD AND APPARATUS FOR FEEDING REACTION GAS AND SOLIDS

FIELD OF THE INVENTION

The present invention relates to a method and apparatus for feeding reaction gas and solids to a suspension smelting furnace, so that the flow rate of the reaction gas is adjusted by means of adjusting members installed in the reaction gas conduit, essentially near to the junction of the reaction gas conduit and the suspension smelting furnace.

BACKGROUND OF THE INVENTION

In order to create an efficient suspension in a suspension smelting furnace, the flow rate of reaction gas must, irrespective of the fluctuations in the amount of solids, maintained at an essentially constant magnitude. If for instance the amount of solids to be fed into a suspension smelting furnace is for some reason reduced, the amount of reaction gas must likewise be reduced. When the amount of reaction gas is reduced, its flow rate also drops if the transversal flow area of the reaction gas remains the same. The flow rate of reaction gas is an important factor in creating an effective suspension, and therefore the flow rate of the reaction gas in a suspension smelting furnace is adjusted in many different ways.

The U.S. Pat. No. 4,331,087 deals with reactions taking place in the reaction chamber of a suspension smelting furnace; in order to create a sufficient velocity difference between the reaction gas and the solid material, the reaction gas is put into strong turbulent motion, so that it meets an annular flow of solids coming from outside, which annular flow is formed by means of a convergent conical glide surface, by utilizing the kinetic energy of the solids. The adjusting method of reaction gas introduced in said U.S. Pat. No. 4,331,087 only pertains to adjusting the circulation of reaction gas, and hence it cannot be applied for adjusting linear gas velocity, mainly in the direction of the central axis of the burner.

In the FI patent applications 922,530 (U.S. Pat. No. 5,362,032) and 932,458, the velocity of the gas flow is adjusted by making the gas flow to be discharged into the reaction space of the smelting furnace in one or several annular flows, so that the discharging speed is defined by adjusting the number of the channels. Then, depending on the chosen flow rate and gas velocity, the gas is discharged into the reaction space radially with respect to the concentrate discharge point and at a different distance than the concentrate.

SUMMARY OF THE INVENTION

The object of the present invention is to eliminate some of the drawbacks of the prior art and to achieve an improved and more efficient method of feeding reaction gas and solids into a suspension smelting furnace, and an apparatus where the transversal area of the reaction gas conduit can advantageously be steplessly adjusted essentially near to the junction of the reaction gas conduit and the suspension smelting furnace, and consequently essentially near to the discharge point of solids fed into the suspension smelting furnace.

In the method and apparatus of the invention, the flow rate of reaction gas is adjusted by advantageously adjusting the transversal area of the reaction gas conduit essentially steplessly by means of the adjusting members installed in the reaction gas conduit. The adjusting members are arranged essentially near to that end of the reaction gas conduit which is on the side of the suspension smelting furnace. The adjusting members are further connected by means of a connecting member. Said connecting member is coupled, by means of a transmitting axis, to an actuator provided outside the reaction gas conduit.

According to the invention, the flow rate of reaction gas is adjusted essentially steplessly only in one annulus, so that the adjusting takes place essentially near to the spot where reaction gas is discharged into the reaction space. The discharge orifice of solids is advantageously located in the vicinity of the gas discharge orifice. When the flow rate is adjusted, the discharge spot of reaction gas in relation to the discharge spot of solids is not changed. Moreover, the adjusting of the flow rate of the reaction gas is carried out essentially in the discharge orifice, in which case the flow rate achieved by adjusting is essentially maintained until the gas flow meets the solid flow in order to form the suspension. A desired mixing effect is thus achieved, and the reactions in between the reaction gas and solids take place in a controlled fashion.

The adjusting of the transversal area of the discharge orifice of reaction gas, accomplished according to the invention, works in a linear fashion in a wide operational area of flow rate. According to the invention, the transversal flow area of reaction gas is advantageously adjusted by means of movable adjusting members supported against the wall of the flow channel. Advantageously the adjusting members are for instance ring sectors, which on the side opposite to the flow channel wall are movably supported against a connecting member common to all adjusting members. This connecting member is further coupled, by means of a drive axis, to an actuator installed outside the flow channel of reaction gas. The actuator can be provided with either manual or remote control, and by means of the actuator - while the amount of solids fluctuates - the transversal area of the reaction gas flow channel can be advantageously and rapidly changed, so that an advantageous flow rate of the reaction gas can be maintained essentially continuously.

The number of the ring sectors used as adjusting members according to the invention can advantageously be for instance eight, and the width of the sector can be 135 degrees, in which case the ring sectors to be adjusted are placed in an overlapping fashion in three layers. However, the number of adjusting members can vary from 4 to 10, in which case the range of the advantageous sectors also varies. In a preferred embodiment of the invention, the number of ring sectors is 4, and the width of a single sector is 90 degrees. The adjusting members are installed adjacent to each other, on essentially the same level in relation to the reaction gas flow channel. By means of the apparatus of the invention, the transversal flow area can be adjusted advantageously within the area of 100%–20% of the unadjusted transversal area of the reaction gas channel.

The adjusting of the transversal flow area of reaction gas by means of the apparatus of the invention increases in the inner energy of a local turbulence in the flow. This energy increase does not, however, have time to attenuate the impulse of the gas flow, but it enhances the mixing of the solids and the gas phase, and thus improves reaction conditions and further intensifies the reaction.

BRIEF DESCRIPTION OF THE DRAWINGS

The apparatus of the invention is described in more detail below with reference to the accompanying drawings, where.

DESCRIPTION OF THE INVENTION

Figure 1:
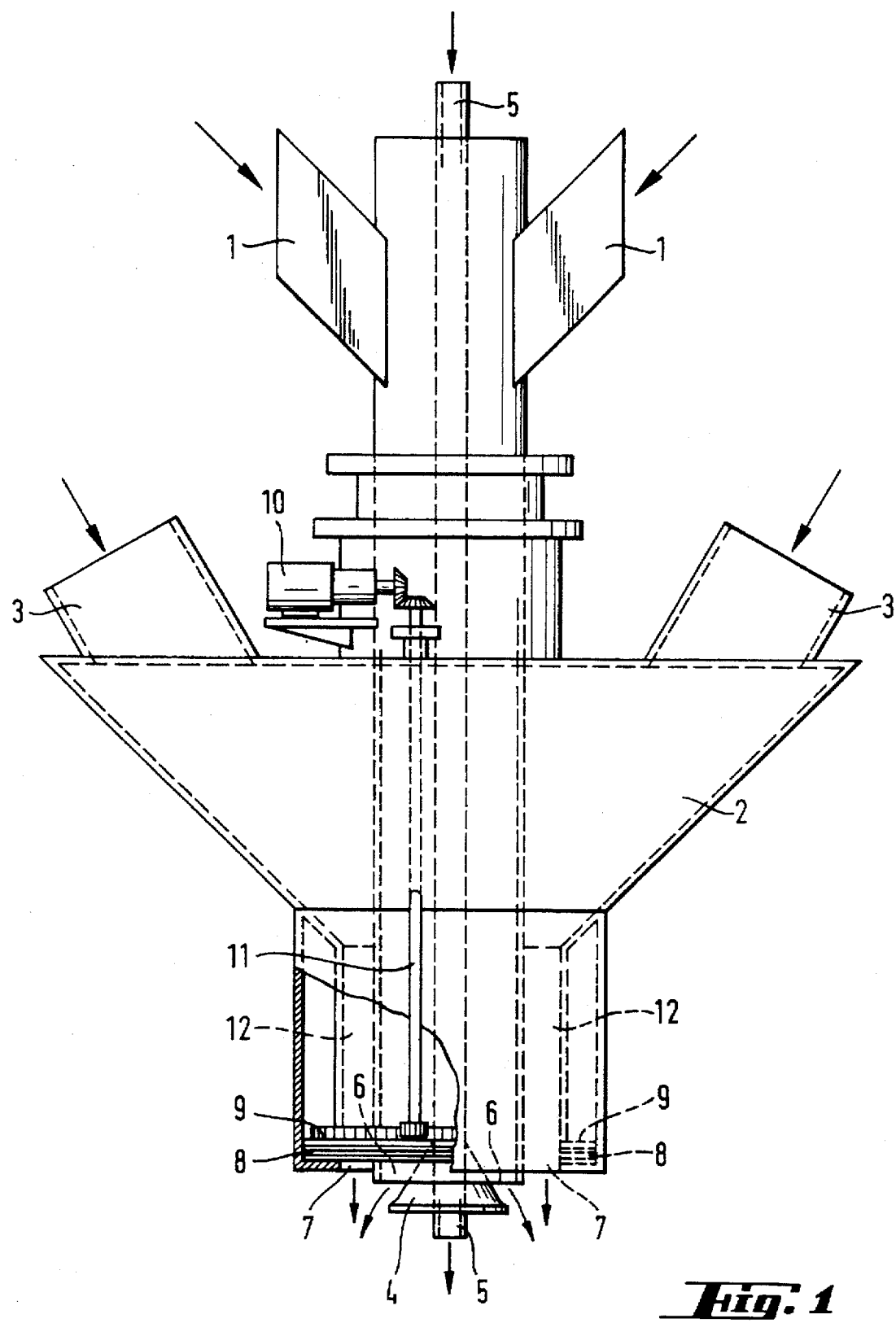
FIG. 1 illustrates a preferred embodiment of the invention in a partial side-view cross-section.

FIG. 1 shows the adjusting apparatus of the invention in a concentrate burner, where the concentrate is fed into the burner via concentrate channels 1. The number of concentrate channels can be one or several. Into the air chamber 2, there is conducted some process gas, generally oxygen-enriched air via conduits 3. The number of gas conduits 3 can also be one or several. The concentrate burner is provided with a central jet distributor 4 and with a central oxygen lance 5. The concentrate is discharged into the reaction space of the suspension smelting furnace from a concentrate channel surrounding the central jet distributor via a concentrate discharge orifice 6. The oxygen-enriched air is discharged through one annular air channel 12 surrounding the concentrate channel via an air discharge orifice 7. The adjusting apparatus according to the invention comprises an actuator 10 installed outside the burner, a drive axis with transmission 11 and movable adjusting members 8 supported against the wall of the air chamber 2. The operation of the actuator can be controlled either manually or with remote control.

The movement of the actuator is transformed, by means of a gear drive, into rotary motion of the drive axis 11. The rotary motion of the drive axis 11 is further transmitted, by means of the gear drive, to rotary motion of the drive ring 9 installed around the air channel 12. Underneath the drive ring 9, the adjusting members 8 provided in connection with the air channel 12, consist of several ring sectors which are on one side articulated to the air chamber 2, and on the opposite side articulated to the drive ring 9. The rotary motion of the drive ring 9 forces the sides articulated to the drive ring 9 of the ring sectors 8 to shift towards the air channel 12, in which case the flow area in the air channel 12 for the reaction gas is reduced, so that the outer circumference of the reaction gas discharge orifice remains essentially circular. A rotary motion of the drive ring 9 in the opposite direction forces the adjusting members 8 to shift away from the reaction gas flow channel 12, so that the flow area in the reaction gas flow channel 12 increases, and the flow rate of the reaction gas slows down.

Figure 2:
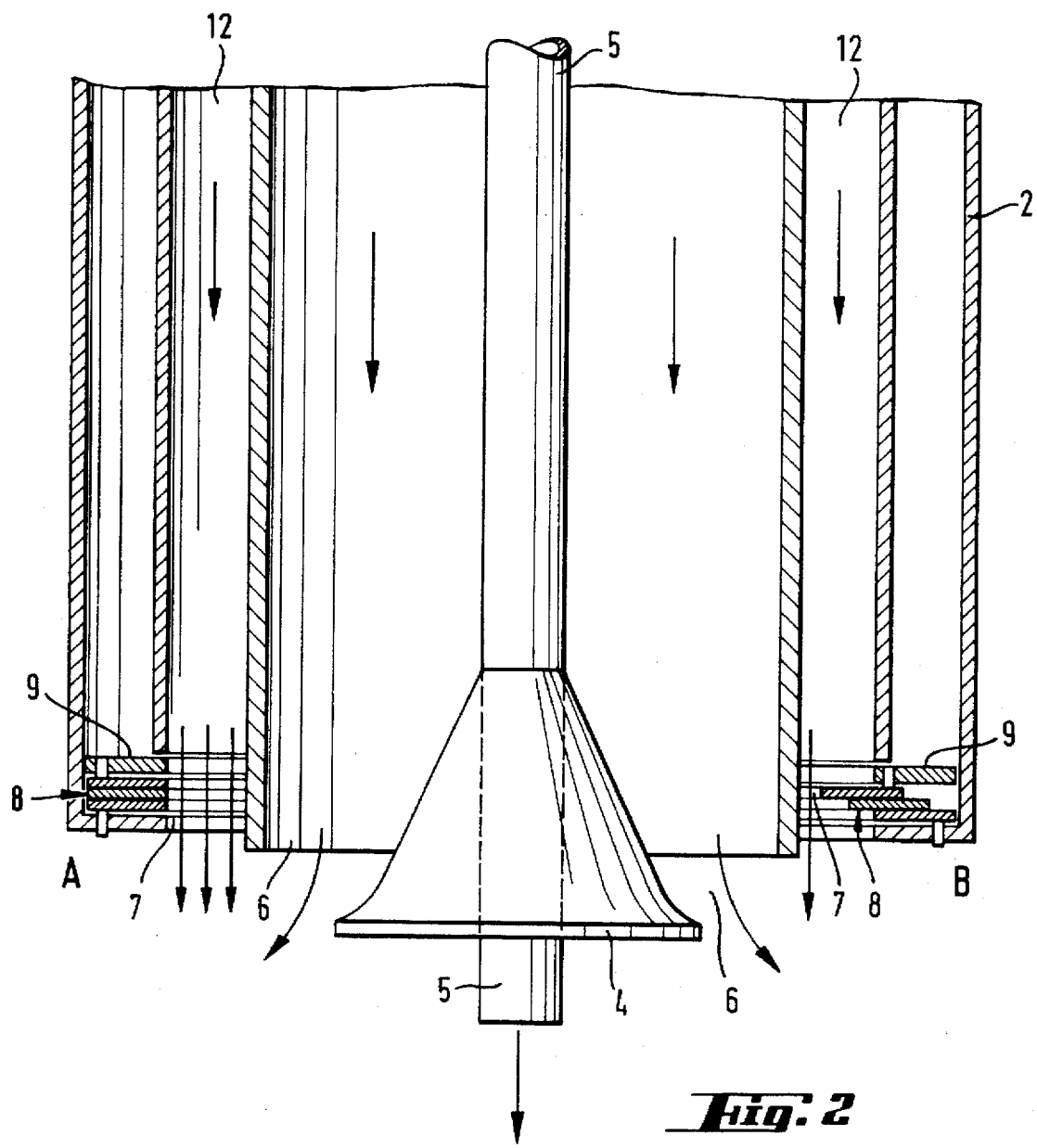
FIG. 2 illustrates the embodiment of FIG. 1 in two different adjusting positions.

Point A of FIG. 2 illustrates a case where the adjusting members 8 are fully open, and the reaction gas is discharged throughout the area of the flow channel 12. Point B shows a case where the adjusting members 8 are in a position throttling the transversal flow area of the reaction gas flow channel 12, so that the reaction gas is discharged along the free area of the reaction gas channel only.

Figure 3:
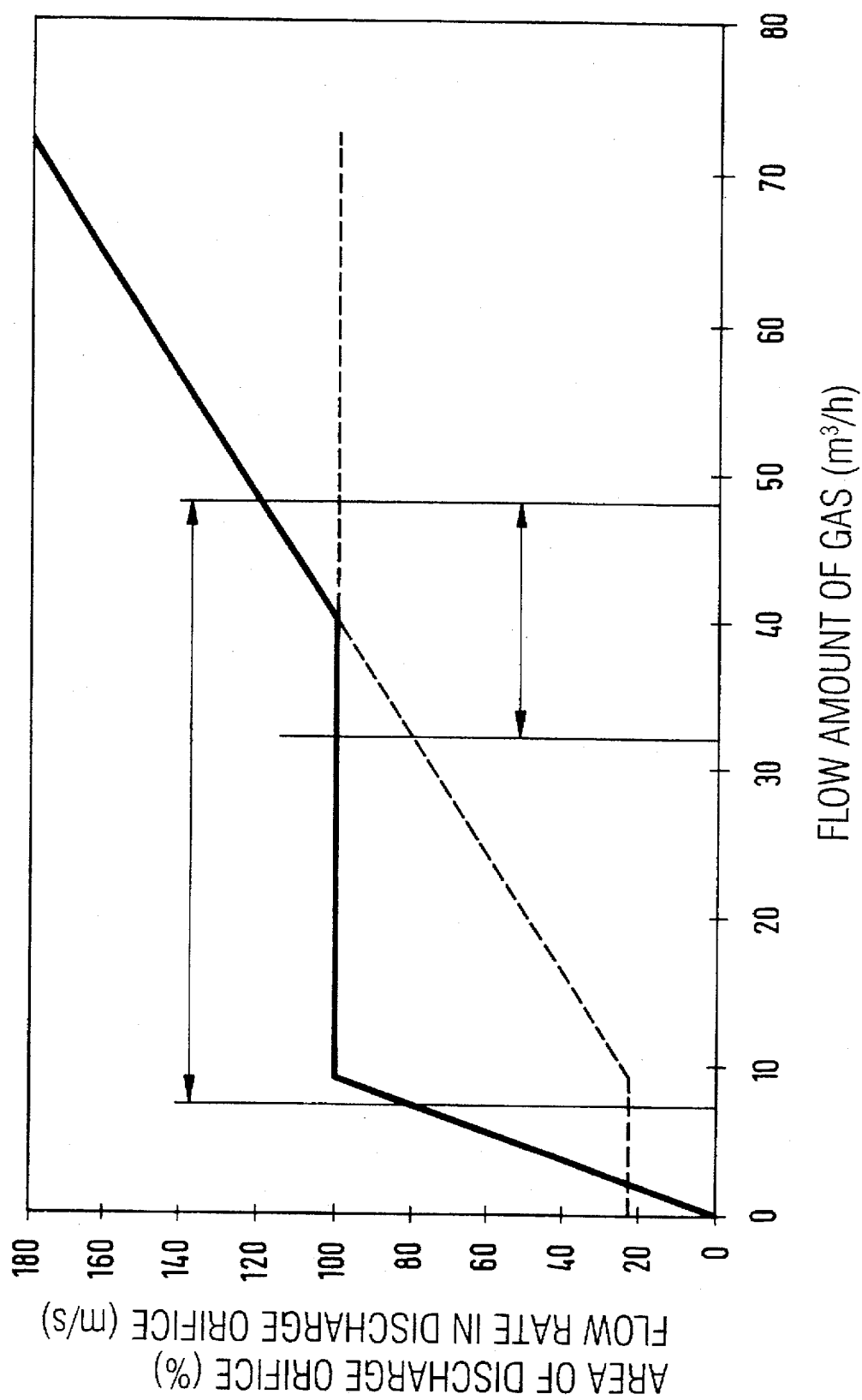
FIG. 3 illustrates the operating range of the embodiment of FIG. 1.

FIG. 3 shows an example of a case where the desired flow rate in the operational area is 100 m/s±20 m/s. With the adjusting array according to the invention, this operational area is achieved in the range 7,200–48,000 $m^3/h$, whereas it would be only 32,000–48,000 $m^3/h$ with an unadjusted application. When operating with remote control, the adjusting can be connected directly to a process computer which adjusts the desired flow rate automatically, for instance when the amount of supplied solids changes.

In the above specification the apparatus of the invention is described with reference to one preferred embodiment only, but it is naturally clear that the invention can be largely modified within the scope defined in the appended claims.

We claim:

1. A method for feeding reaction gas and solids to a suspension smelting furnace comprising receiving solids and conducting the received solids to a suspension smelting furnace through a solids feeding channel; receiving reaction gas and feeding at least the major part of the reaction gas into the suspension smelting furnace through a reaction gas channel surrounding the solids feeding channel; and adjusting the flow rate of the reaction gas fed into the suspension smelting furnace steplessly by changing the position of adjusting members installed in the reaction gas channel substantially near an end of the reaction gas channel proximate the suspension smelting furnace.

2. A method according to claim 1, wherein the adjusting step further comprises changing the transversal area of the reaction gas channel by changing the position of the adjusting members.

3. A method according to claim 1 or 2, wherein the adjusting step further comprises adjusting the flow rate of the reaction gas in a portion of the reaction gas channel having the shape of an annulus.

4. An apparatus for feeding reaction gas and solids into a suspension smelting furnace, comprising at least one reaction gas conduit for receiving reaction gas and at least one solids feeding channel for receiving and conducting solids into the suspension smelting furnace, a reaction gas channel for receiving reaction gas from the at least one reaction gas conduit, wherein at least a portion of the reaction gas channel surrounds at least a portion of the solids feeding channel proximate the suspension smelting furnace and at least the major part of the reaction gas is fed into the suspension smelting furnace through the reaction gas channel; adjusting members located within the reaction gas channel, substantially near the end of the reaction gas channel proximate the suspension smelting furnace for adjusting the transversal flow area of the reaction gas channel essentially steplessly; and a connecting member for interconnecting the adjusting members, the connecting member being arranged around the reaction gas channel.

5. An apparatus according to claim 4, wherein the adjusting members comprise ring sectors.

6. An apparatus according to claim 4 or 5, wherein the number of the adjusting members is 4–10.

7. An apparatus according to claim 4 or 5, wherein the adjusting members are arranged in an overlapping fashion with respect to each other.

8. An apparatus according to claim 4 or 5, wherein the adjusting members are manually adjustable.

9. An apparatus according to claim 4 or 5, wherein the adjusting members are remotely controlled.

10. An apparatus according to claim 4 or 5, wherein, by means of the adjusting members, the transversal area of the reaction gas channel is adjustable within the range of 100%–20% of the unadjusted area of the whole transversal area.

\* \* \* \* \*